(12) United States Patent
Liu et al.

(10) Patent No.: US 7,508,781 B2
(45) Date of Patent: Mar. 24, 2009

(54) POWER SAVING MECHANISM FOR WIRELESS LANS VIA SCHEDULE INFORMATION VECTOR

(75) Inventors: Yonghe Liu, Dallas, TX (US); Jin-Meng Ho, Plano, TX (US); Matthew B. Shoemake, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 895 days.

(21) Appl. No.: 10/396,921

(22) Filed: Mar. 25, 2003

(65) Prior Publication Data

US 2004/0190467 A1 Sep. 30, 2004

(51) Int. Cl.
*G08C 17/00* (2006.01)
(52) U.S. Cl. .................. 370/311; 370/329; 455/574
(58) Field of Classification Search ............. 370/311, 370/329, 332, 333, 445, 447, 458, 461, 462, 370/328, 338, 345, 346, 347, 348; 455/574, 455/343.2, 515, 516, 517
See application file for complete search history.

(56) References Cited

U.S. PATENT DOCUMENTS

| | | | | |
|---|---|---|---|---|
| 5,241,542 | A * | 8/1993 | Natarajan et al. | 370/311 |
| 6,091,717 | A * | 7/2000 | Honkasalo et al. | 370/329 |
| 6,141,336 | A * | 10/2000 | Bauchot et al. | 370/348 |
| 6,272,117 | B1 * | 8/2001 | Choi et al. | 370/330 |
| 6,707,867 | B2 * | 3/2004 | Diepstraten et al. | 375/354 |
| 6,791,962 | B2 * | 9/2004 | Wentink | 370/338 |
| 6,917,598 | B1 * | 7/2005 | Emeott et al. | 370/311 |
| 6,990,116 | B1 * | 1/2006 | Young et al. | 370/445 |
| 7,274,707 | B2 * | 9/2007 | Choi et al. | 370/445 |
| 7,412,265 | B2 * | 8/2008 | Chen et al. | 455/574 |
| 2003/0053480 | A1 * | 3/2003 | Jang et al. | 370/445 |
| 2003/0128684 | A1 * | 7/2003 | Hirsch et al. | 370/338 |
| 2003/0152059 | A1 * | 8/2003 | Odman | 370/338 |
| 2003/0161340 | A1 * | 8/2003 | Sherman | 370/445 |
| 2004/0125753 | A1 * | 7/2004 | Mahany et al. | 370/254 |
| 2004/0184475 | A1 * | 9/2004 | Meier | 370/449 |

(Continued)

OTHER PUBLICATIONS

"The IEEE 802.11 Standard", INRIA, Planete Team, Planete, IMAD AAD, IN'Tech, May 31, 2002, 52 pgs.

(Continued)

*Primary Examiner*—Chi H. Pham
*Assistant Examiner*—Kevin Mew
(74) *Attorney, Agent, or Firm*—Frederick J. Telecky, Jr.; Wade J. Brady, III

(57) ABSTRACT

A new protocol system and method is described that utilizes a Schedule Information Vector (SIV) protocol for saving power in wireless local area networks. The protocol includes an access point, one or more stations, and an SIV frame including an association ID for identifying one of the stations and a scheduled wake-up time for the identified station. The access point originates and transmits the SIV frame protocol of the scheduled wake-up time to the stations. The SIV frame protocol of the wireless network is further operable to dynamically adjust the scheduled wake-up times of the stations, a sequence of the wake-up times, a periodic wake-up time, a plurality of wake-up times, and a duration of the wake-up times of the stations. These adjustments may be made based on network traffic, traffic buffering times, data priorities, data length, and data rates.

33 Claims, 8 Drawing Sheets

U.S. PATENT DOCUMENTS

| | | | |
|---|---|---|---|
| 2004/0190467 A1 | 9/2004 | Liu et al. | |
| 2004/0264397 A1* | 12/2004 | Benveniste | 370/311 |
| 2005/0013266 A1* | 1/2005 | Kubler et al. | 370/328 |
| 2005/0043068 A1* | 2/2005 | Shohara et al. | 455/574 |
| 2006/0165046 A1* | 7/2006 | Del Prado Pavon | 370/350 |

OTHER PUBLICATIONS

"QoS Support on IEEE 802.11a (IEEE 802.11e)" Ph. Rouzet, Jan. 26, 2002, 16 pgs.

"Power-Saving Mechanisms in Emerging Standards for Wireless LANs: The MAC Level Perspective", Hagen Woesner, Jean-Pierre Ebert, Morten Schläger and Adam Wolisz, IEEE Personal Communications, Jun. 1998, pp. 40-48.

"The IEEE 802, 11 Standard", Inria, Planete Team, Planete, IMAD AAD, IN'Tech, May 31, 2002, 52 pages.

"Implementation Experiences of Bandwidth Guarantee on a Wireless LAN", Srikant Sharma, Kartik Gopalan, Ningning Zhu, Gang Peng, Pradipta De and Tzi-Cker Chiueh, taken from the Internet at: www.ecsi.cs.sunysb.edu/~chiueh/cse634/wrether.pdf, publication date Dec. 2001, 24 pages.

"IEEE 802.11 Tutorial", part one Jim Zyren and Al Petrick, retrieved from http://www.ydi.com/deployinfo/wp-80211-tutorial.php?screen=print on Apr. 16, 2007, copyright 2004, 3 pages.

"QoS Support on IEEE 802.11a (IEEE 802.11e)" Ph. Rouzet, Jan. 26, 2002, 16 pages.

"A Short Tutorial on Wireless LANs and IEEE 802.11", Daniel L. Lough, T. Keith Blankship and Kevin J. Krizman, retrieved from: http://www.computer.org/students/looking/summer97/ieee802.htm on Apr. 13, 2007, dated Feb. 7, 2002, 6 pages.

"Power-Saving Mechanisms in Emerging Standards for Wireless LANs: The MAC Level Perspective", Hagen Woesner, Jean-Pierre Ebert, Morten Schlager and Adam Wolisz, IEEE Personal Communications, dated Apr. 5, 2001, 15 pages.

"IEEE 802.11e Wireless LAN for Quality of Service", Stefan Mangold, Sunghyun Choi, Peter May, Ole Klein, Guido Hiertz and Lothar Stibor, dated Feb. 2002, 8 pages.

"IEEE 802.11 Tutorial", part two Jim Zyren and Al Petrick, retrieved from http://www.ydi.com/deployinfo/wp-80211-tutorial.php?screen=print on Apr. 16, 2007, copyright 2004, 2 pages.

* cited by examiner

200 ↘

Inter-Frame Spaces for 802.11B DSSS (μs.)

| SLOT TIME | SIFS TIME | PIFS TIME | DIFS TIME |
|---|---|---|---|
| 20 | 10 | 30 | 50 |

Frame Body of Action Frame

| 235 | 240 | 245 | 250 | 255 | 260 |
|---|---|---|---|---|---|
| FIELD NAME | CATEGORY CODE | ACTION CODE | ACTIVATION DELAY | DIALOG TOKEN | ACTION BODY |
| BYTES | 1 | 1 | 1 | 1 | 0-2300 |

Action Body of SIV Frame

| 235 | 280 | 285 | 290 | 295 |
|---|---|---|---|---|
| FIELD NAME | $N_{SIV}$ | AID | SCHEDULE | LISTENING WINDOW |
| BYTES | 2 | $2N_{SIV}$ | $2N_{SIV}$ | 2 |

FIG. 5B

POWER SAVING MECHANISM FOR WIRELESS LANS VIA SCHEDULE INFORMATION VECTOR

FIELD OF INVENTION

The present invention relates generally to wireless networks and more particularly to systems and methods for saving power in wireless local area networks.

BACKGROUND OF THE INVENTION

The Institute of Electrical and Electronics Engineers (IEEE) has produced a series of standards referred to as 802.X, which encompasses LANs (Local Area Networks), MANs (Metropolitan Area Networks) and PANs (Personal Area Networks) such as Bluetooth. The IEEE 802 is confined to standardizing processes and procedures that take place in the bottom two layers of the OSI (Open System Interconnection) reference model—the media access control (MAC) sublayer of the link layer and the physical layer.

The original standard that is currently used to establish a wireless local area network (WLAN) is the IEEE 802.11 standard. The IEEE 802.11 standard was published first in 1997 and it was designed to provide data rates up to 2 Mbps (such as a DSL connection) at 2.4 Ghz. The standard includes specifications for Media Access Control (MAC) and physical layer operation. The physical layer standard was designed to use either frequency hopping spread spectrum (FHSS) or direct sequence spread spectrum (DSSS). In 1999, 802.11a and 802.11b provided enhancements at the physical layer with higher data rate support up to 54 Mpbs in the 5 GHz band and 11 Mbps in the 2.4 GHz band, respectively.

The newly developed 802.11e standard is working to enhance the current 802.11 MAC to expand support for applications with high QoS (Quality Of Service) requirements. Wireless networks fit both business and home environments, that both require the support of multimedia, and the 802.11e standard provides the solution for this need. In both wired and wireless networks, data transmission is susceptible to interruptions caused when packets are present or lost during the transmission process. These interruptions can cause problems for data to be streamed in a contiguous fashion. The 802.11e has created a QoS baseline document that proposes methods for handling time-sensitive traffic.

In the WLAN topology, each wireless network requires a radio transceiver and antenna. Components on the wireless network are either stations (STAs) or access points (APs). Typically, a station STA is mobile or portable, and the access point AP may be a permanent structure analogous to a base station tower used in cellular phone networks or to a hub used in a wired network. A basic service set (BSS) is formed when two or more stations have recognized each other and established a network. An extended service set (ESS) is formed when BSSs (each one comprising an AP) are connected together.

A standard WLAN according to 802.11 operates in one of two modes—ad-hoc (peer-to-peer) or infrastructure mode. The ad-hoc mode is defined as Independent BSS (IBSS), and the infrastructure mode as a BSS. WLANs may also be classified as distributed (ad-hoc), or as centralized systems (infrastructure based system).

In ad-hoc mode (IBSS), each client communicates directly with the other clients within the network on a peer-to-peer level sharing a given cell coverage area. This mode was designed such that only the clients within transmission range of each other can communicate. If a client in an ad-hoc network wishes to communicate outside of the range, one of the clients (members) must operate as a gateway and perform routing.

FIG. 1 illustrates the basic service set BSS 1 operating in the infrastructure mode, wherein a wireless network is formed between one or more stations (STA) 2 communicating with an access point (AP) 4 such as a communications tower. The access point acts as an Ethernet bridge and forwards the communications onto the network (e.g., either wired or wireless network). Several such BSS networks communicating together over the infrastructure between APs further form an Extended Service Set (ESS), or a Distribution System (DS).

Before stations and access points can exchange data, they must establish a relationship, or an association. Only if an association is established can the STA and AP exchange data. The association process involves three states:

Unauthenticated and unassociated

Authenticated and unassociated

Authenticated and associated

In the transition between the states, the communicating parties exchange messages called management frames. The APs are designed to transmit a beacon management frame at fixed intervals. To associate with an access point and join the BSS, a station listens for beacon messages to identify the access points within the range. After the station receives a beacon frame (message) it selects the BSS to join. The network names, or service set identifiers (SSID) contained in the beacon frame, permit the user to choose the SSID the user wishes to join. A station can also send a probe request frame to find the associated access point with the desired SSID. After the station identifies the access point, they perform an authentication by exchanging several management frames.

As illustrated in prior art FIG. 2, a wireless transceiver 20, according to the OSI (Open System Interconnection) reference model, comprises in part, a series of protocol layers 23 having a physical layer PHY 24, a data link layer 26, and a NETWORK layer 28. The data link layer 26 further comprises a medium access control MAC 26a sublayer and a logical link control LLC 26b sublayer. The OSI reference model describes networking as a series of protocol layers with a specific set of functions allocated to each layer. Each layer offers specific services to higher layers while shielding these layers from the details of how the services are implemented. A well-defined interface between each pair of adjacent layers defines the services offered by the lower layer to the higher one and how those services are accessed.

The physical layer PHY 24 is involved in the reception and transmission of the unstructured raw bit stream over a physical medium. It describes the electrical/optical, mechanical, and functional interfaces to the physical medium. The PHY 24 layer carries the signals for all the higher layers. The MAC 26a sublayer of the data link layer 26, manages access to the network media, checks frame errors, and manages address recognition of received frames.

The LLC 26b sublayer establishes and terminates logical links, controls frame flow, sequences frames, acknowledges frames, and retransmits unacknowledged frames. The LLC 26b sublayer uses frame acknowledgement and retransmission to provide virtually error-free transmission over the link to the layers above. The NETWORK layer 28 controls the operation of the subnet. It determines the physical path the data should take, based on network conditions, priority of service, and other factors, including routing, traffic control, frame fragmentation and reassembly, logical-to-physical address mapping, and usage accounting.

Wireless transceiver 20 also illustrates a packet of data 30 which may be transmitted or received via the NETWORK layer 28 and other higher level layers of the transceiver 20.

Wireless Local Area Networks (WLAN) are gaining increasing popularity today by establishing anywhere and anytime connections. According to recent predictions, the market of WLAN adapters will reach 35 million units in 2005. However, a larger market for WLAN lies in the mobile device world such as cellular phones and PDAs, whose market is projected to reach 500 million units in 2005.

As more WLAN chips are embedded into battery powered mobile devices, power consumption inevitably becomes a bottleneck to its wide deployment. The average power consumption for a typical WLAN adaptor, employing the power saving technique specified in the IEEE 802.11 standard, is significantly higher than a normal cellular phone. This further implies that a cellular phone with current battery capacity will be drained in substantially less time if a WLAN chip is embedded.

Recent advancements in circuit design have reduced the power consumption of WLAN chips dramatically in sleep mode. For example, the power consumption in deep sleep state is only 2 mw in the Texas Instruments TNETW1100B series chips. However this reduction alone is not able to alleviate the problem to the same degree in current wireless LANs, as the power reduction in the deep sleep mode cannot be fully utilized.

The impeding force is the broadcast based wireless MAC protocol. To receive a frame addressed to itself, a station has to continuously monitor the wireless channel and decode every frame for the MAC address to be checked against its own. Compared with the stations transmission or reception of data, this contending procedure commonly dominates the activity of a wireless station and prevents the station from sleeping. Consequently, power consumption during contention is a major contribution to battery drain.

Recent research proposes exploiting the low power consumption available during sleep mode. Allowing a station to wake up only periodically, often at several beacon intervals, this approach requires the AP to buffer power saving traffic and deliver it according to the station's pre-negotiated listening interval.

Although such an approach reduces the power consumption significantly, it does not fully address the problem. For example, all portable devices can benefit from power savings. With the increasing amount of power saving traffic, a station waking up at a certain beacon will likely face fierce competition retrieving or receiving data from the AP, and once again, waste significant power during contention. Further, power saving traffic may be associated with additional QoS constraints. For example, a voice traffic stream has a stringent delay requirement, but relatively low and periodic bandwidth consumption. However, the delay requirement will preclude the station from entering sleep mode according to the protocol given above, as frequently a beacon interval is about 100 ms. In addition, the situation is exacerbated by the increasing set of QoS applications incorporating WiFi networks.

Accordingly, there is a need for an improved protocol to address the problems associated with QoS and power saving utilization, while ensuring scalability during increased power saving traffic on a wireless local area network.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention relates to a new protocol system and method implemented in the MAC sublayer, utilizing a Schedule Information Vector (SIV) protocol for saving power in wireless local area networks. The protocol comprises an access point, one or more stations, and an SIV frame comprising one or more association IDs for identifying stations and corresponding schedules of wake-up times for the identified stations. The access point originates and transmits the SIV frame protocol of the scheduled wake-up time to the stations. When an identified station awakes at the scheduled time, the AP directs the station to uplink or downlink data according to another suitable protocol, for example, the contention free protocol as specified by 802.11e. For example, the AP may, according to one aspect of the invention, direct the identified station to receive a poll for uplink CF transmission, or to receive downlink CF data, thereby minimizing time the station must remain awake, thus saving power by minimizing time in channel contention.

In another aspect of the present invention, the SIV frame protocol of the wireless network is further operable to dynamically adjust one or more of the following: the scheduled wake-up times of the stations, a sequence of the wake-up times, a periodic wake-up time, a plurality of wake-up times, and a duration of the wake-up times of the stations. These dynamic adjustments may be made based on one or a combination of network traffic, traffic buffering times, data priorities, data length, and data rates. For example, scheduling sequential or offset wake-up times of various stations may be used to provide service differentiation to different stations based on their individual requirements.

In still another aspect of the present invention, the SIV frame is further operable to schedule one of a next CC/RR (Controlled Contention/Request Reservation) sequence and SIV frame for the identified station. For example, a CC/RR type protocol may be used to provide a method of determining, with little overhead, which stations have traffic to send on a heavily loaded network. The present invention also provides for transmission of the SIV frame from the AP either before or after a beacon, and or in conjunction with the Traffic Indication Map (TIM) field of the beacon.

Yet another aspect of the invention provides a wireless network wherein the SIV may be transmitted to a single target station for self-correction or retransmission of the SIV.

Still another aspect of the invention provides a method of saving power in a wireless network comprising an access point, a station, and an SIV frame. The method comprises awaking at a periodic time to monitor an SIV frame transmitted from the access point, and determining whether a station's association ID (AID) is indicated within the SIV. If the station's AID is not indicated, the station sleeps until the next SIV to repeat the same checking procedure; if the station's AID is indicated and uplink data is to be transmitted to the AP, the station sleeps till the designated time in the SIV frame to receive a poll for uplink data; if the station's AID is indicated and downlink data is to be transmitted from the AP, the station sleeps till the designated time in the SIV frame to receive downlink data.

The method of saving power also comprises determining a scheduled time from the SIV for uplink, sleeping until the scheduled time for poll, and awaking at the scheduled time and transmitting uplink data after the reception of a poll. The method also includes determining a scheduled time from the SIV for downlink, sleeping until the scheduled time for downlink, awaking at the scheduled time and receiving downlink data, and finally sleeping until a next beacon. The method also includes determining a scheduled time from the SIV for sending uplink requests, sleeping until the scheduled time for transmitting the uplink requests, and awaking at the scheduled time for transmitting uplink request. The procedures for sending uplink requests can follow, e.g., the CC/RR protocol.

To the accomplishment of the foregoing and related ends, the following description and annexed drawings set forth in detail certain illustrative aspects and implementations of the invention. These are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

FIG. 4 is a diagram illustrating exemplary timing relationships used in Inter-Frame Spaces according to IEEE 802.11b using DSSS;

FIG. 5A is a diagram illustrating an exemplary action frame body according to IEEE 802.11e for the SIV frame in accordance with an aspect of the present invention;

FIG. 5B is a diagram illustrating an exemplary format of the frame body of an action frame for the SIV frame in accordance with an aspect of the present invention;

DETAILED DESCRIPTION OF THE INVENTION

Figure 1:
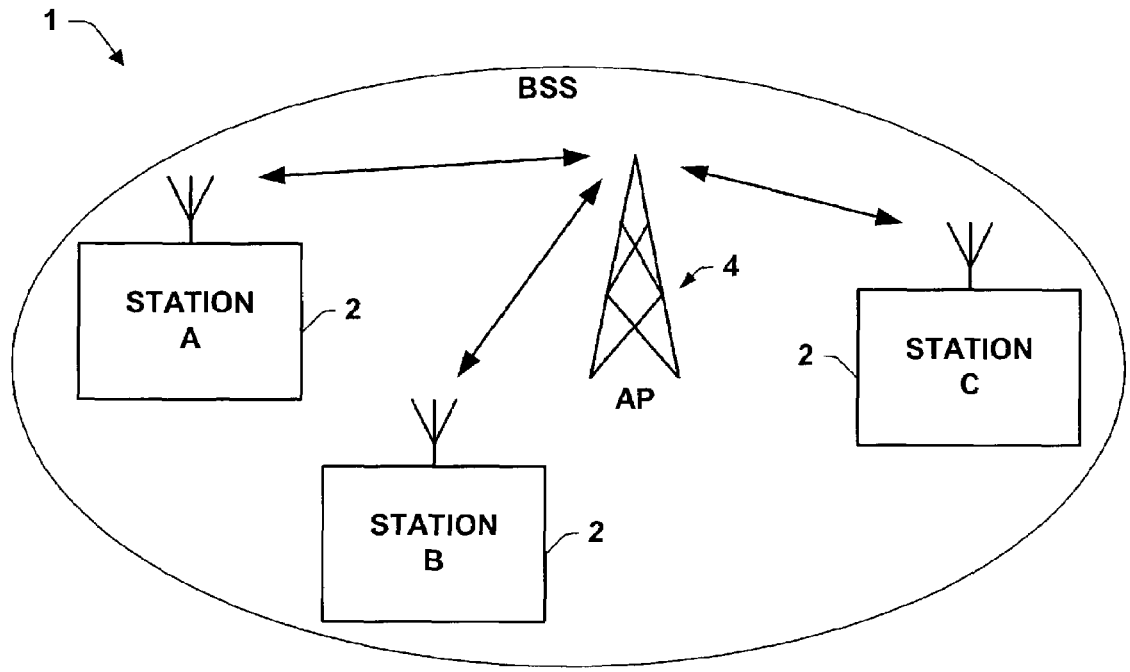
FIG. 1 is a prior art diagram illustrating a basic service set BSS of a wireless network operating in the infrastructure mode.
Figure 2:
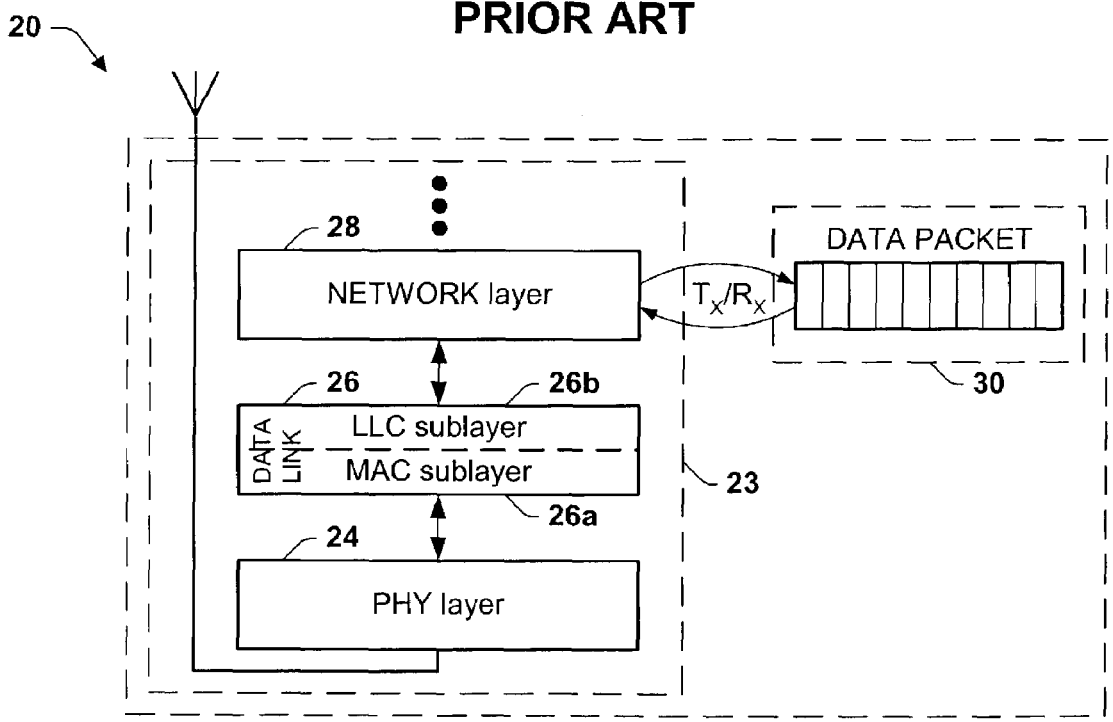
FIG. 2 is a prior art diagram of a wireless transceiver, according to the OSI reference model illustrating a series of protocol layers and a data packet to be transmitted or received.

The present invention will now be described with reference to the attached drawings, wherein like reference numerals are used to refer to like elements throughout. The invention relates to a wireless network in which a new protocol is introduced utilizing a schedule information vector SIV frame as a power savings mechanism. In order to better appreciate one or more features of the invention, several exemplary implementations of the SIV frame, timing diagrams for the same, an associated TSPEC element, and a power saving method is hereinafter illustrated and described with respect to the following figures.

Figure 3:
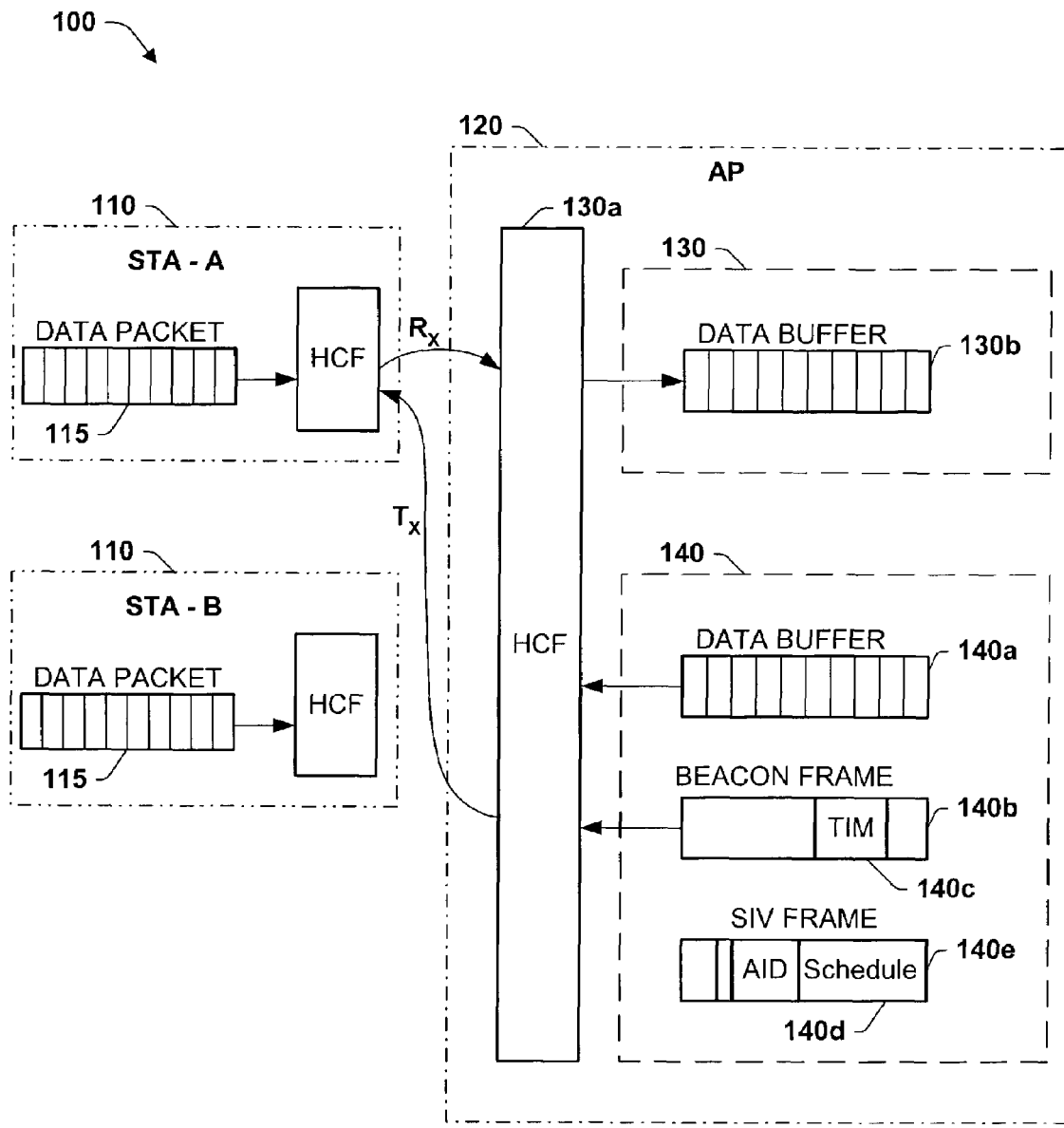
FIG. 3 is a simplified diagram of an exemplary data packet exchange between a station and an access point during an uplink or a downlink according to one aspect of the present invention.

FIG. 3 illustrates a simplified diagram of an exemplary wireless network 100 for saving power during a data packet exchange via an uplink or a downlink in accordance with one aspect of the present invention. The exemplary wireless network 100, comprises one or more stations STA-A and STA-B 110, that may either uplink a data packet 115 (e.g., of power saving data) transmitted to an access point AP 120, or receive the data packet 115 in a downlink transmission from the AP 120. The AP 120 may further comprise a transceiver having a receiver section $R_X$ 130 and a transmitter section $T_X$ 140.

Data received, for example, according to the hybrid coordination function HCF 130a, is put in data buffer 130b in the $R_X$ 130 section to be extracted and placed on the network infrastructure associated with the AP 120. Data to be transmitted, for example, from the $T_X$ 140 section is assembled in DATA BUFFER 140a after transmission of a beacon BEACON 140b, comprising a traffic indication map TIM 140c having association IDs (AIDs) and a schedule information vector frame SIV 140e having scheduling information 140d in accordance with the present invention. To save power, before data is transmitted or received in the exemplary network 100, the SIV protocol provides a scheduled time for stations STA-A and STA-B 110 to awake and begin the uplink or downlink with the AP 120 of the associated network infrastructure. Awaking at a scheduled time, according to the SIV 140e protocol, minimizes time and power that, for example, STA-A 110 may otherwise waste contending for the channel with another such station STA-B 110 within the network 100.

For example, according to one aspect of the present invention, the SIV frame protocol of the wireless network may provide a scheduled wake-up time for STA-A 110 which is offset by 2 ms from the wake-up time of STA-B 110 which is also offset by 2 ms from the wake-up time of another such station (not shown), to minimize any channel contention between the stations and the AP 120. The inventors of the present invention have found that minimizing channel contention time is a key factor in wireless network power savings.

In another aspect of the present invention, the SIV frame protocol of the wireless network may be dynamically adjusted to provide the scheduled wake-up times of the stations, a sequence of the wake-up times, a periodic wake-up time, a plurality of wake-up times, and a duration of the wake-up times of the stations. These dynamic adjustments may be made based on one or a combination of network traffic, traffic buffering times, data priorities, data length, and data rates.

Thus, the inventors herein introduce the Schedule Information Vector SIV protocol. The SIV pre-schedules power saving traffic and announces the scheduled transmission time to each power saving station. Therefore, after collecting the schedule information, a station can remain asleep and wake up only at the designated (scheduled) time or multiple scheduled times. The protocol is facilitated by the newly specified 802.11e Hybrid Coordination Function (HCF), which incorporates the previous Distributed Coordination Function DCF, the enhanced DCF (EDCF), and the point coordination function PCF. By employing HCF, for example, the AP can obtain access to the wireless channel as needed and is thus capable of transmitting the power saving traffic according to the schedule. Although the SIV concept of the present invention is discussed in conjunction with the above standards, it should be understood that incorporation may occur in other protocols and such alternatives are contemplated as falling within the scope of the present invention.

Although power reduction by employing SIV is significant, the advantage of SIV extends beyond this. By scheduling the transmissions of the stations at different times, the SIV protocol has the potential to transform the contention based 802.11 MAC into a TDMA (time division multiple access) based protocol, which generally has higher throughput and lower power consumption. In addition, full backward compatibility is maintained, which means that legacy stations can still use the contention based access mechanism to gain control of the channel.

The 802.11e Hybrid Coordination Function

The SIV protocol, according to the present invention, is an enhancement to the recently specified 802.11e MAC.

The Hybrid Coordination Function (HCF) was proposed by the 802.11e group to provide QoS enhancements to the current 802.11 MAC. HCF uses a contention-based channel access method, called the Enhanced Distributed Coordination Function (EDCF) concurrently with a polling based, contention free (CF) channel access mechanism. Contention based and contention free channel access methods can be alternated freely by the AP. A station (STA), or an access point (AP), may obtain transmission opportunities (TXOP) at a period of time during which the channel is dedicated to the station, using either channel access mechanism.

The SIV protocol is substantially based on the contention free method. However, in order to clarify the alternation between contention-based and contention-free transmission essential to the backward compatibility, both are described in the following.

Contention Based Access

EDCF is an enhancement of the original DCF mechanism with the support of service differentiation among different traffic categories. EDCF maintains multiple queues corresponding to different traffic categories rather than a single queue in DCF. Each queue contends for the channel using the original MAC protocol, i.e., a "back-off" interval is generated for each queue and whenever it counts down to zero, a head-of-line packet (packet header) is transmitted.

Prioritized services are provided by assigning a different Arbitration Inter-Frame Space (AIFS) and an initial contention window size CWmin to traffic categories. Intuitively, lower CWmin leads to a shorter back-off interval thus higher chance of channel access. The AIFS denotes the period of channel idle before the back-off counter can decrease. During a period of congestion, a larger AIFS will decrease the channel access opportunity by preventing the back-off counter from decrementing.

If more than one queue reaches zero at the same time, the traffic category with the highest priority wins and transmits. Lower priority traffic categories assume a collision and increase their contention windows.

Contention Free Access

In contrast to EDCF, contention free access is based on a polling scheme controlled by a Hybrid Coordinator (HC) operating at the access point. HC gains control of the wireless medium as needed to send QoS traffic or to issue QoS (+)CF-Polls to stations. The higher priority of HC is obtained by waiting a shorter time between transmissions than the stations using EDCF or DCF access procedures. Specifically, HC can start transmitting when the channel is sensed to be idle for a PIFS (PCF Inter-Frame Space) time.

FIG. 4 summarizes an exemplary timing relationship diagram 200 of the different inter-frame spaces for 802.11b DSSS expressed in microseconds. The times shown for Inter-Frame spaces for 802.11b DSSS, represent exemplary values which may be used in the context of the present invention.

Contention based and contention free transmission can be flexibly alternated by the HC, i.e., the channel is open for contention if it has been idle for a DIFS time.

Power Saving Mechanism under HCF

The power saving mechanism under HCF is termed Automatic Power Save Delivery (APSD). As in the 1997 802.11 standard, APSD allows a station to wake up from sleep state periodically to listen to the beacon, in which the AP indicates the presence of buffered traffic using the Traffic Indication Map (TIM) field. However, for a station whose ID is present in TIM, 802.11 defines different behavior from that of 802.11e. In 802.11, an identified station remains awake and sends PS-Polls to the AP to retrieve buffered traffic from the AP. By contrast, in 802.11e, an identified station simply remains awake and silently waits for the frames delivered by the AP. Under both standards, the station can go back to sleep if the AP sets the "more data" field in a data frame to zero.

The advantages of APSD over the PS mechanism in the 1997 standard are two-fold. First, a station no longer needs to transmit PS-Polls under APSD and hence the power for transmitting and contending the channel is eliminated. Secondly, the AP has full control of the delivery order of the frames buffered at the AP, which may pertain to different QoS classes.

However, APSD does not fully address the power saving problem, particularly considering QoS requirements. Under APSD, a station typically remains awake for the reception of data. During this waiting period, the station decodes all the data on the network and hence may consume unnecessary power on irrelevant data. The situation will deteriorate on a congested network or as a result of increased power saving traffic.

When QoS data is present with more stringent requirements than the power saving data, the AP will likely transmit the power saving data following the QoS data. Therefore, the waste of power will be exacerbated further as the percentage of QoS traffic increases on the wireless network.

Furthermore, APSD only allows a station to wake up once per beacon interval, which usually is about 100 ms. This essentially prohibits any QoS data with a delay requirement less than 100 ms from entering sleep mode. For example, a delay sensitive telnet application with bursty and sporadic traffic may waste considerable power forcing the WLAN chip to monitor the channel continuously. Therefore, APSD has not provided a flexible method to harmoniously address the requirements of both power saving and QoS.

The Schedule Information Vector

Given the limitation of the APSD on power saving, the inventors conceived of and designed the Schedule Information Vector (SIV) to reduce the high power consumption on contention while a station waits for its data.

The SIV schedules a station to wake up predominately at a designated time for the reception of downlink data or polls for uplink traffic. This is accomplished by broadcasting or unicasting schedule information to a particular station in the current BSS by the HC. Once a station receives its own schedule, it can enter sleep mode and only wake up at the specified time.

The SIV protocol is detailed in the following aspects: the design of a frame for delivering the schedule information, a detailed description of the behavior at the AP and stations, and a discussion of the exception handling when a schedule disturbance is encountered. Although the SIV frame is operable to deliver a broadcast schedule to multiple stations, it may further comprise a unicast schedule to a particular station.

The action frame in 802.11e is employed as the base frame type used in association with the present invention. The action frame is defined as a wildcard frame where customized functions can be incorporated. The frame inherits the same header format as that of the data frames and uses the frame body having various parameter values.

FIG. 5A illustrates the format of the frame body 230 of the action frame in 802.11e used in association with the SIV frame of FIG. 5B. FIG. 5B, for example, illustrates an exemplary Action Body 232 of an SIV frame, and the format of the SIV protocol in accordance with several aspects of the present invention. The Field Name 235 identifies the specific field within the frames of FIGS. 5A and 5B, together with a corresponding number of bytes used within each field.

Category Code 240, together with the Action Code 245, specifies the corresponding action of the receiver of the action frame.

Activation Delay 250 defines the maximum tolerated delay for the execution of the action frame.

Dialog Token 255 regulates the feedback method.

Action Body field 260 includes the parameters of the execution of the frame body 230.

In FIG. 5B, four fields are contained in the Action Body 232 of the SIV frame of the present example, namely $N_{SIV}$ 280, AIDs 285, Schedule 290, and Listening Window 295.

$N_{SIV}$ 280 denotes the number of stations scheduled in the current frame. More precisely, it denotes the number of AIDs contained in the AID field 285.

AID 285 numerates the Association IDs of the scheduled stations. An AID of zero represents another SIV frame or CC frame to be sent out by the AP. This enables the flexibility of the SIV protocol to recursively schedule a power saving station or collecting of uplink requests. For example, due to unexpected poor channel conditions, the original schedule for a power saving station may not be fulfilled. Under such circumstances, the AP can send out an SIV frame with a 0 AID to schedule the station to wake up for future schedule information.

Schedule 290 comprises the schedules corresponding to different stations in the order given in the AIDs field 285. Notice that the schedule is a relative time (e.g., a time offset), relative to the current SIV frame. For example, a schedule of 10 ms denotes that the station's traffic will be sent 10 ms after the transmission of the current SIV frame. By choosing a relative schedule time instead of an absolute time, the synchronization requirement can be dramatically relaxed.

Listening Window 295, denotes the time period, following the scheduled time, during which the AP should send out the traffic. Due to possible channel variations and bursty traffic, an absolute guarantee of a transmission time on the shared wireless channel is unrealistic. The Listening Window 295 enhances the flexibility of scheduling, for example, in the presence of higher priority data.

The Behavior of the AP and Stations using the SIV Protocol

Downlink power saving data is first buffered at the AP with its presence indicated at each beacon transmission via the TIM field. In the aforementioned, the presence of uplink power saving data at a station may be collected, for example, via the CC/RR protocol. As discussed in association with FIG. 3, the presence of power saving data may indicate either data to be downlinked ($T_x$) from the AP to an AID indicated station STA, or uplinked ($R_x$) to the AP from the AID indicated STA.

Following the beacon frame, the AP will schedule the power saving traffic, subject to the QoS requirements and the presence of non-power-saving data. Once the schedule is determined, the AP will transmit the SIV frame. At the pre-scheduled time, the AP will transmit the power saving data to the corresponding AID indicated station, subject to the requirement of the listening window 295 of FIG. 5B. If a scheduling decision could not be immediately reached, the AP may simply announce the transmission time for another SIV frame 300 of FIG. 5C and announce the schedule for power saving data using the scheduled SIV frame at a later time.

A power saving station needs to wake up periodically for the beacon and SIV frames. If a station finds its AID present in the AID field of the SIV frame, it continues parsing the Schedule field (e.g., 290 of FIG. 5B, 380 of FIG. 5C). Based on the scheduled time presented therein, the station decides whether to go back to sleep or continue listening, based on the length of the schedule. A short schedule denotes that the transmission of a stations' own power saving data will follow the SIV frame shortly. Entering and leaving sleep state in such a short period of time may incur additional power consumption powering up and down different modules, thus there may be no net power savings benefit entering the sleep state for a period less than some minimum.

If the station enters sleep mode, at the later specified time, the station needs to wake up early enough to guarantee the reception of the frames delivered from the AP. Once the exchanges sequence is over, indicated by a cleared "more data" field sent by the AP for downlink data or by the station for uplink data, the station can reenter sleep mode and prepare for awaking at the next beacon. Thus in one example, each station may receive a new schedule via another SIV following the next beacon.

For example, FIGS. 6A-6D illustrate timing diagrams of several successive station responses to various AID indications in the TIM of a beacon from an AP, employing the SIV protocol in accordance with an aspect of the present invention. In each of the FIGS. 6A-6D, timing response 410 illustrates what the AP is transmitting and receiving, while timing response 420 illustrates the response to a first station STA1 with downlink data to receive from the AP. Timing response 430 illustrates the response to a second station STA2 with uplink data to transmit to the AP, while response 440 illustrates the response to a third station STA3, with no data to transmit or receive.

Figure 6A:
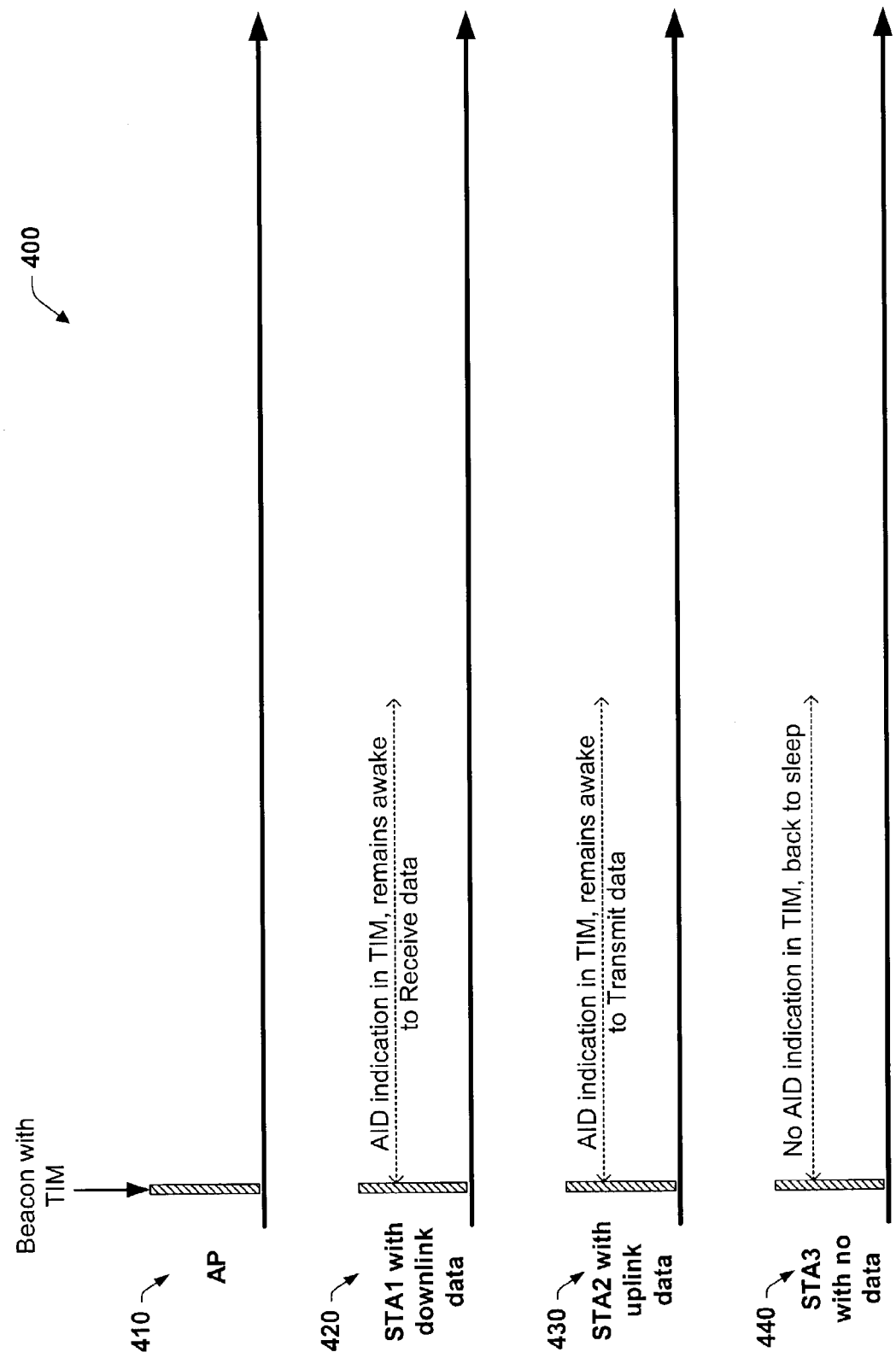
FIGS. 6A-6D are timing diagrams illustrating several station's successive responses to various AID indications in the TIM of a beacon and schedules in an SIV frame in accordance with an aspect of the present invention.

In FIG. 6A, timing diagram 400 illustrates transmission of the beacon from the AP. The beacon includes the TIM comprising the AID and SIV frame protocol. In response 420, STA1 finds its AID is indicated in the TIM to receive data from the AP, so STA1 remains awake to receive the downlink CF data. In response 430, STA2 also finds itself buffering data to be transmitted to the AP, so STA2 also remains awake to send a request for uplink data and to receive a poll for the uplink CF transmission. In response 440, STA3 does not find its AID indication in the TIM or any data to be transmitted to the AP, so STA3 is allowed to go back to sleep mode till the next beacon.

Figure 6B:
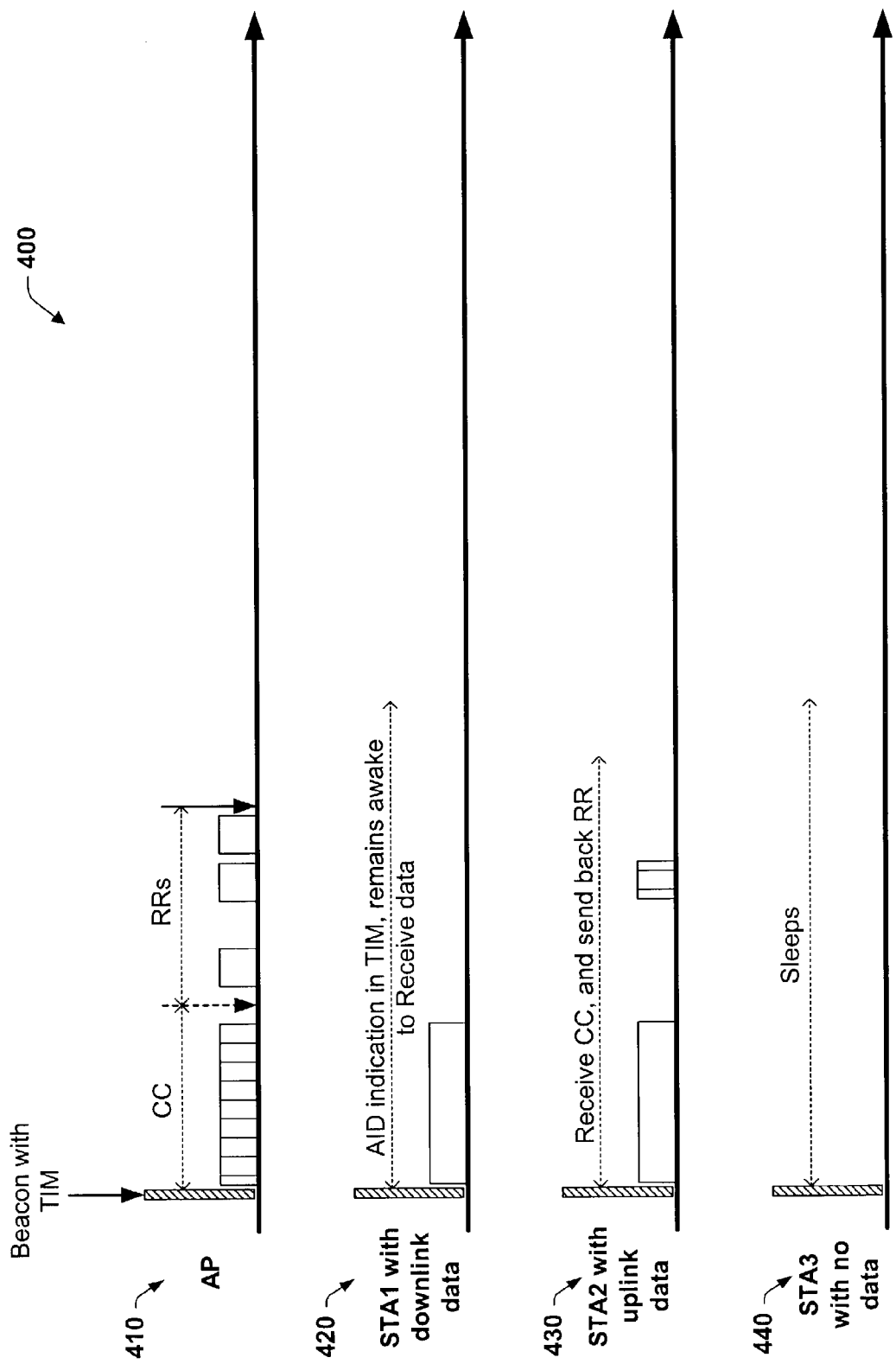

In FIG. 6B the exchange sequence begins between the AP and STA1 and STA2 to downlink and uplink data respectively. In 410, the AP sends out first a frame to collect uplink requests from different station, for example a CC frame. In response 420, STA1 simply remains awake awaiting the SIV frame for the scheduled time for the downlink CF data. In response 430, STA2 sends a request for the uplink data, for example by sending an RR frame. The AP collects received RRs and determines their respective schedule in conjunction with buffered downlink data, e.g, to STA 1.

Figure 6C:
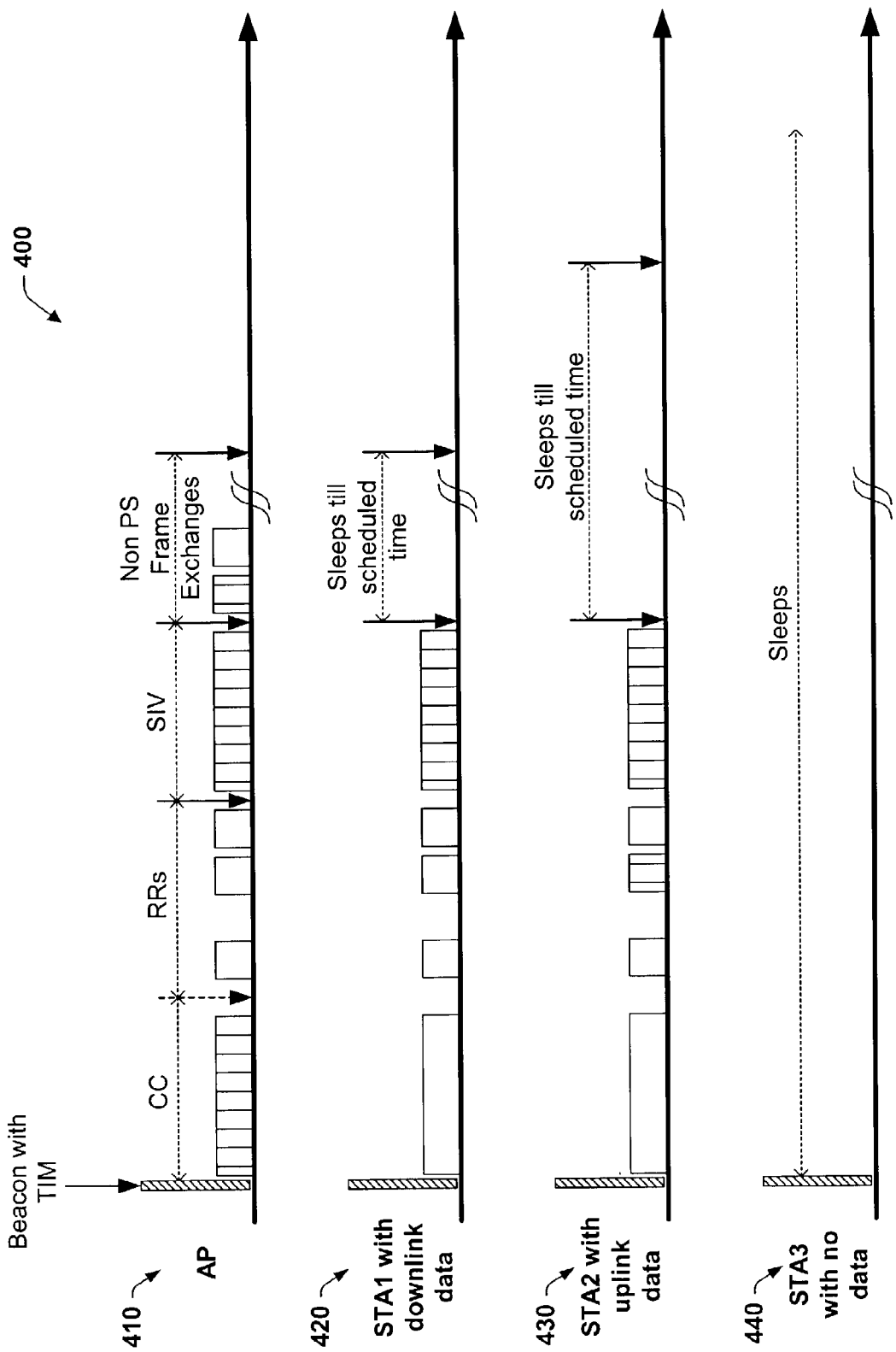

In FIG. 6C of timing diagram 400, the exchange sequence between the AP and STA1 and STA2 completes when the SIV frame has been received and the power savings schedules are determined. In response 420, STA1 determines from its schedule that it may enter sleep mode until a scheduled time to downlink data. In response 430, STA2 determines from its schedule that it may also enter sleep mode until a different (e.g., later time than STA1) scheduled time to uplink data.

Meanwhile, the AP, in response 410 is shown to be busy processing non power savings frame exchanges (e.g., with other stations, not shown).

Figure 6D:
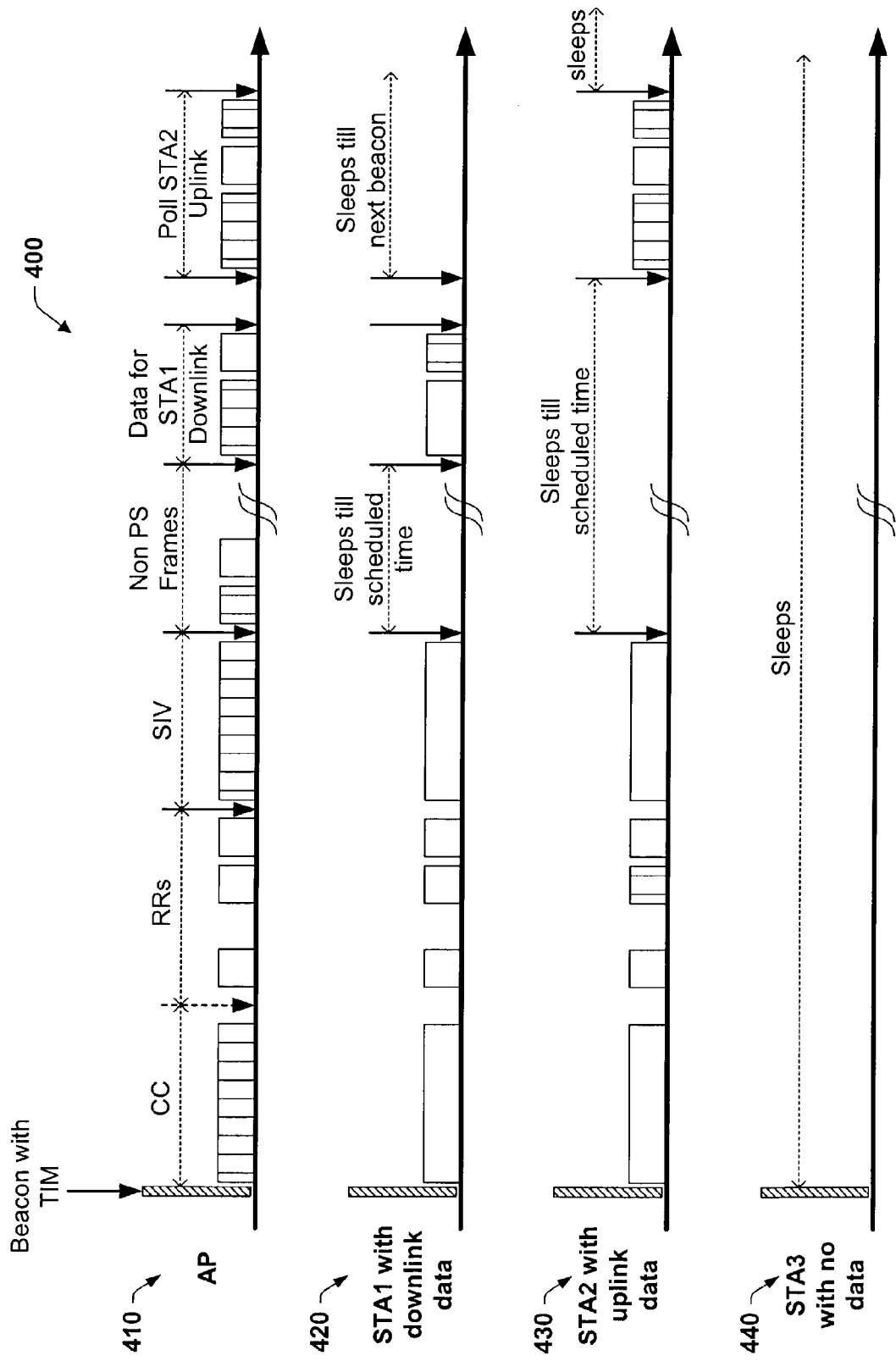

Finally, in FIG. 6D of timing diagram 400, the scheduled times begin arriving for STA1 and STA2 to awake from sleep mode. For example, response 410 and 420 show that STA1 has awaken at the scheduled time to receive the downlink CF data from the AP, while response 430 shows that STA2 still sleeps. When STA1 has finished the CF data downlink, STA1 is permitted to reenter sleep mode till the next beacon. Then, in response 430, STA2 awakes at its scheduled time to receive a poll from the AP. As further shown in the AP response 410, the AP polls STA2 at the scheduled time to initiate the uplink transmission from STA2. Thereafter, STA2 also joins STA1 and STA3 in sleep mode until the next beacon.

Therefore, the present invention provides a wireless network power savings protocol that permits stations to remain in a sleep mode until a pre-scheduled time, avoiding contention for the channel and the power that would otherwise be wasted during such contention. As discussed above in connection with FIGS. 6A-6D, multiple transmissions within one beacon interval are also facilitated by the SIV protocol.

Handling Exceptions

Scheduling ahead on a wireless network is subject to disturbance from errors on the wireless medium and the arrival of higher priority data. As a result, the AP may not be able to fulfill the pre-schedule at the specified time.

In this and other such scenarios, there are two possible solutions in accordance with the present invention. According to one approach and aspect of the invention, the protocol is configured to degrade to the APSD as specified in the standard. To be more specific, the AP will ignore the pre-schedule and perform scheduling appropriate to the new situation. In response to the absence of the scheduled transmission, the indicated station remains awake and continues monitoring the channel for reception of its data. In accordance with another approach and aspect of the invention, at the pre-scheduled time, the AP may send out a unicast SIV frame to the station with the altered scheduling information, wherein the station may adjust its expected time for data reception. Meanwhile, the station may reenter sleep mode for further power savings.

Thus, the wireless network power savings protocol of the present invention also accommodates higher priority data while requiring no additional frame formatting.

Another aspect of the invention provides a methodology for saving power in a wireless network that may be employed in association with the SIV frame protocol illustrated and described herein, as well as wired networks and other types of networks.

Figure 7:
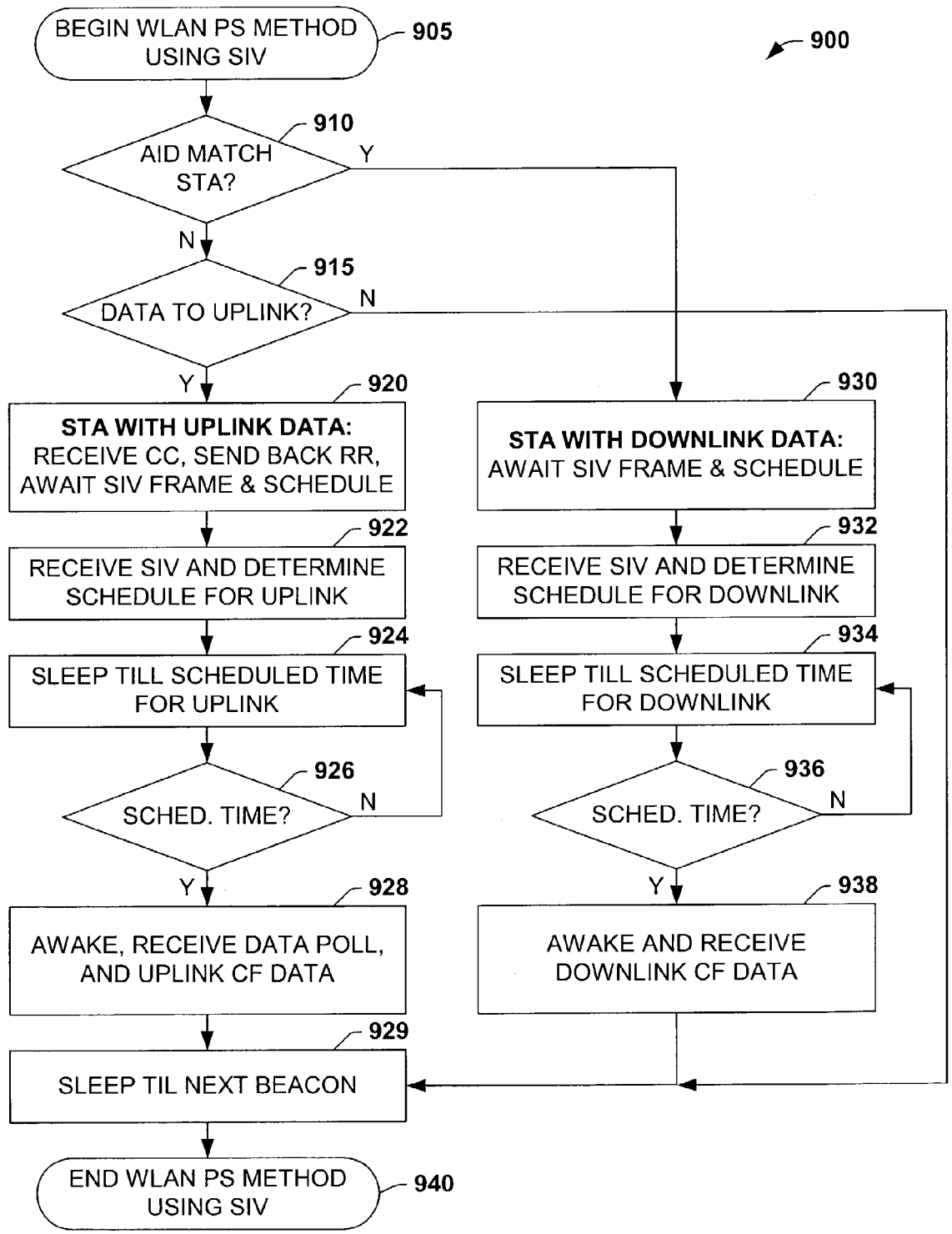
FIG. 7 is a flow chart diagram illustrating a method of saving power in a wireless network in accordance with an aspect of the present invention.

Referring now to FIG. 7, an exemplary method 900 is illustrated for saving power in a wireless network comprising an access point AP, a station STA, and an SIV frame protocol in accordance with the present invention. While the method 900 and other methods herein are illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the method 900 according to the present invention may be implemented in association with the network elements, protocols and formats illustrated and described herein as well as in association with other elements, protocols and formats not illustrated.

The method 900 comprises initially awaking the STA at a periodic time to monitor a beacon transmitted from the AP, and determining whether an association ID of the station is indicated within a TIM of the beacon. If the STAs association ID (AID) is not indicated and there is no uplink data to be transmitted, the STA returns to a sleep mode until a next beacon from the AP.

Method 900 also includes determining whether uplink data is to be transmitted from the STA to the AP. If the stations AID indicates uplink data is to be transmitted to the access point, the station remains awake, receives a CC from the AP and returns an RR back to the AP. When the SIV frame is received and a scheduled time for uplink is determined based on the SIV, the station is permitted to return to the sleep mode until the scheduled time for the uplink. The method then includes awaking at the scheduled time, sending a request for uplink CF data, receiving a poll for uplink CF data and transmitting uplink CF data to the AP.

Otherwise, if the stations' AID is indicated and downlink data is to be received from the AP, the station remains awake waiting for the SIV frame from the AP. When the SIV frame is received and a scheduled time for downlink is determined based on the SIV, the station is permitted to return to the sleep mode until the scheduled time for the downlink. The method then includes awaking at the scheduled time and receiving the downlink CF data, and returning to the sleep mode until the next beacon.

The exemplary power saving method 900 of FIG. 7, in accordance with the wireless network of FIG. 3, and the timing diagrams of FIGS. 6A-D, begins at 905. Initially the AP transmits a beacon having a traffic indication map TIM that includes an AID for identifying a station and an SIV frame in accordance with the SIV protocol of the present invention. According to the protocol, the STAs awaken at a periodic time to monitor the beacon transmitted from the AP and SIV frame. At 910, a determination is made whether the AID of the station is indicated (a match) within the TIM of the beacon. If, at 910, the STAs AID is not indicated and no data to uplink to the AP, the STA returns to a sleep mode until a next beacon from the AP at 929.

Otherwise, if at 910, the STAs AID is not indicated but data is to be uplinked (transmitted) from the STA to the access point at 915, the station is directed to remain awake at 920, receive a CC from the AP and return an RR back to the AP, and awaits the SIV frame. The SIV frame is received at 922 and a scheduled time for uplink is determined based on the SIV. The station is then permitted to return to the sleep mode at 924 until the scheduled time for the uplink is determined at 926. The station then awakens at the scheduled time at 928, receives a poll for uplink CF data, and transmits uplink CF data to the AP, and returns to the sleep mode at 929 until the next beacon.

Otherwise, if the stations AID is indicated at 910 and downlink data is determined to be received at 915 from the AP, the station is directed at 930 to remain awake waiting for the SIV frame from the AP. The SIV frame is received at 932 and a scheduled time for downlink is determined based on the SIV. The station is then permitted to return to the sleep mode at 934 until the scheduled time for the downlink is determined at 936. The station then awakens at the scheduled time at 938 and receives the downlink CF data, and returns to the sleep mode at 929 until the next beacon.

Thereafter, the power savings method of the present invention ends at 940, wherein one or more stations may uplink or downlink CF data with an access point of a wireless network.

Thus, the present invention provides a wireless network power savings protocol that permits stations to remain in a sleep mode until a pre-scheduled time, avoiding contention for the channel and the power that would otherwise be wasted during such contention. In addition the exemplary method of the SIV protocol, facilitates multiple transmissions within one beacon interval.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising."

What is claimed is:

1. A system for saving power in a wireless network, comprising:
    an access point;
    one or more stations; and
    an SIV frame comprising:
        one or more schedules of wake-up times, corresponding to the one or more stations;
    wherein the access point originates and transmits the SIV frame of the scheduled wake-up time to the one or more stations, wherein the one or more stations selectively awake from a sleep mode for data transmission therewith based on the schedule, wherein at least one of the one or more stations determines whether uplink data is to be transmitted from the at least one of the one or more stations to the access point in response to receiving a beacon indicating an identity of the at least one of the one or more stations, keeping the at least one of the one or more stations awake, the at least one of the one or more stations receives a request from the access point to indicate whether the at least one of the one or more stations has uplink data to be transmitted to the access point, and the at least one of the one or more stations sends to the access point prior to receiving the SIV frame an indication that uplink data is to be transmitted to the access point, and where in the at least one of the one or more stations transmits the uplink data to the access point according to the SIV frame.

2. The SIV frame of claim 1, wherein the SIV frame comprises:
    a schedule field comprising one or more schedules for scheduling the next wake-up time of one or more stations, based on one of an offset relative to a last beacon or a next beacon, and an offset relative to the current SIV frame; and
    wherein the one or more stations are directed to uplink or downlink CF data, thereby minimizing time the station must remain awake, saving power while minimizing channel contention.

3. The SIV frame of claim 2, wherein the SIV frame further comprises an AID field to numerate the one or more association IDs of the one or more stations for identifying one or more of the stations.

4. The SIV frame of claim 3, wherein the SIV frame further comprises an N.sub.SIV field to denote the number of stations scheduled in the current frame, wherein the number of association IDs contained in the AID field.

5. The SIV frame of claim 4, wherein the SIV frame further comprises a listening window field to denote the time period following the scheduled wake-up time, during which the AP should send network traffic.

6. The SIV frame of claim 2, wherein the SIV frame is further operable to schedule one of a next CC frame and a next SIV frame for the one or more stations.

7. The SIV frame of claim 2, wherein the SIV frame is further operable to schedule one or a combination of wake-up times, a sequence of wake-up times, a periodic wake-up time, a plurality of wake-up times, and a duration of the wake-up times for the stations as identified by the SIV frame.

8. The wireless network of claim 2, wherein the uplink data is sent via a protocol that provides a method of collecting requests for delay sensitive signaling or bursty traffic.

9. The wireless network of claim 8, wherein the protocol comprises a CC/RR protocol, thereby providing a method of determining with little overhead, which stations have traffic to send on a heavily loaded network.

10. The SIV frame of claim 2, wherein the SIV frame occurs after the last beacon.

11. The SIV frame of claim 2, wherein the SIV frame occurs before the next beacon.

12. The wireless network of claim 1, wherein the SIV frame is transmitted to the stations within a TIM frame of a beacon.

13. The wireless network of claim 1, wherein the access point is configured to generate a TSPEC element comprising a PS interval for specifying a timing offset relative to the current transmission.

14. The wireless network of claim 1, wherein the access point is further operable to dynamically adjust one or more of the scheduled wake-up times of the stations, a sequence of wake-up times, a periodic wake-up time, a plurality of wake-up times, and a duration of the wake-up times of the stations, based on one or more of network traffic, traffic buffering time, data priorities, data length, and data rates.

15. The wireless network of claim 14, wherein the dynamic adjustments are made by the access point in the fields of the SIV frame.

16. The wireless network of claim 14, wherein the access point has a higher channel access priority than that of any station of the network.

17. The wireless network of claim 1, wherein the access point is further operable to unicast the SIV to one station, thereby providing self correction or retransmission of a schedule for an individual station.

18. The wireless network of claim 1, wherein the access point is further operable unicast an SIV frame to a station to alter one or more of the scheduled wake-up times of the station in response to errors on the network and to the arrival of higher priority data.

19. The wireless network of claim 1, further providing an SIV protocol configurable to allow the access point to ignore current scheduling activities and perform scheduling in response to errors on the network and to the arrival of higher priority data.

20. A method of saving power in a wireless network comprising an access point, a station, and an SIV frame, the method comprising:
- awaking the station from a sleep mode to monitor a beacon from the access point;
- determining whether a station's association ID is indicated in the beacon;
- returning the station to the sleep mode if the station's association ID is not indicated;
- keeping the station awake if the station's association ID is indicated;
- determining whether uplink data is to be transmitted from the station if the station's association ID is indicated;
- receiving a contention communication from the access point and responding with a reservation request if there is uplink data to be transmitted from the station to the access point prior to receiving the SIV frame;
- transferring the SIV frame containing schedule data to the station;
- returning the station to the sleep mode and awakening the station for data transmission therewith based on the schedule data;
- determining whether uplink data is to be transmitted from the station to the access point;
- receiving a request from the access point to indicate whether the station has uplink data to be transmitted from the station to the access point;
- sending an indication from the station to the access point prior to receiving the SIV frame that uplink data is to be transmitted to the access point; and
- transmitting the uplink data to the access point according to the SIV frame.

21. A method of saving power in a wireless network comprising an access point, a station, and an SIV frame, the method comprising:
- awaking the station from a sleep mode to monitor a beacon from the access point;
- determining whether a station's association ID is indicated in the beacon;
- returning the station to the sleep mode if the station's association ID is not indicated;
- receiving the SIV frame containing schedule data from the access point;
- returning the station to the sleep mode and awakening the station for data transmission therewith based on the schedule data;
- determining whether uplink data is to be transmitted from the station to the access point if the station's association ID is indicated in the beacon; and
- keeping the station awake; and
- receiving a CC from the access point and sending an RR back from the station to the access point prior to receiving the SIV.

22. The method of claim 21, wherein returning the station to sleep mode comprising returning the station to sleep mode after receipt of the SIV, and maintaining the station in sleep mode until the schedule data dictates that the station awaken.

23. The method of claim 21, further comprising:
- determining whether downlink data is to be transmitted from the access point to the station if the station's association ID is indicated in the beacon; and
- keeping the station awake until SIV frame containing schedule data is received.

24. The method of claim 23, further comprising returning the station to sleep mode after receipt of the SIV frame, and maintaining the station in sleep mode until the schedule data dictates that the station awaken.

25. The method of claim 21, wherein awaking the station to monitor a beacon from the access point, comprises awaking the station at a periodic time to monitor a beacon from the access point.

26. The method of claim 21, wherein determining whether a station's association ID is indicated, comprises determining whether a stations association ID is indicated within a TIM of the beacon.

27. The method of claim 21, further comprising modifying the schedule data within a subsequent SIV frame based on one or more of network traffic, traffic buffering time, data priorities, data lengths and data rates.

28. The method of claim 20, wherein returning the station to sleep mode comprising returning the station to sleep mode after receipt of the SIV, and maintaining the station in sleep mode until the schedule data dictates that the station awaken.

29. The method of claim 20, further comprising:
- determining whether downlink data is to be transmitted from the access point to the station if the station's association ID is indicated in the beacon; and
- keeping the station awake until SIV frame containing schedule data is received.

30. The method of claim 29, further comprising returning the station to sleep mode after receipt of the SIV frame, and maintaining the station in sleep mode until the schedule data dictates that the station awaken.

31. The method of claim 20, wherein awaking the station to monitor a beacon from the access point, comprises awaking the station at a periodic time to monitor a beacon from the access point.

32. The method of claim 20, wherein determining whether a station's association ID is indicated, comprises determining whether a stations association ID is indicated within a TIM of the beacon.

33. The method of claim 20, further comprising modifying the schedule data within a subsequent SIV frame based on one or more of network traffic, traffic buffering time, data priorities, data lengths and data rates.

* * * * *